United States Patent
MacDonald

(10) Patent No.: US 9,951,482 B2
(45) Date of Patent: Apr. 24, 2018

(54) VIBRATION ISOLATION FOR COMPACTOR

(71) Applicant: VOLVO CONSTRUCTION EQUIPMENT AB, Eskilstuna (SE)

(72) Inventor: Michael MacDonald, Shippensburg, PA (US)

(73) Assignee: Volvo Construction Equipment AB, Eskilstuna (SE)

(*) Notice: Subject to any disclaimer, the term of this patent is extended or adjusted under 35 U.S.C. 154(b) by 0 days.

(21) Appl. No.: 15/520,205

(22) PCT Filed: Dec. 9, 2014

(86) PCT No.: PCT/US2014/069262
§ 371 (c)(1),
(2) Date: Apr. 19, 2017

(87) PCT Pub. No.: WO2016/093801
PCT Pub. Date: Jun. 16, 2016

(65) Prior Publication Data
US 2017/0306574 A1    Oct. 26, 2017

(51) Int. Cl.
*E01C 19/00* (2006.01)
*E01C 19/28* (2006.01)
(Continued)

(52) U.S. Cl.
CPC .............. *E01C 19/286* (2013.01); *B06B 1/16* (2013.01); *E01C 19/28* (2013.01); *F16F 15/22* (2013.01);
(Continued)

(58) Field of Classification Search
CPC .... E01C 19/28; E01C 19/286; E01C 2301/02; F16F 15/22; F16F 2232/02; B06B 1/16
(Continued)

(56) References Cited

U.S. PATENT DOCUMENTS 3,966,344 A * 6/1976 Haker .................... B06B 1/162
                                                                  404/103
4,269,536 A * 5/1981 Goehler ................ E01C 19/286
                                                                  172/184
(Continued)

FOREIGN PATENT DOCUMENTS

JP          H0747445 Y2      11/1995

OTHER PUBLICATIONS

International Search Report and Written Opinion of International Searching Authority for PCT/US2014/069262, dated Aug. 26, 2015; ISA/KR.

*Primary Examiner* — Raymond W Addie
(74) *Attorney, Agent, or Firm* — Womble Bond Dickinson (US) LLP

(57) ABSTRACT

A vibratory compactor comprising an active isolation apparatus for reducing a vibration generated during the rotation of an eccentric shaft having an eccentric weight attached thereto. The active isolation apparatus comprises a drum, a propulsion motor configured to rotate the drum, a drive plate disposed between the propulsion motor and the drum in such a way as to be connected to the propulsion motor to transmit a rotating force to the drum, and a drum support configured to rotatably support the drum. The active isolation apparatus further comprises a first active isolation mass disposed between the drum support and the drum, a second active isolation mass disposed between the drive plate and the drum, an eccentric shaft configured to be rotated while penetrating through the first active isolation mass, the drum, and the second active isolation mass, a primary eccentric weight attached to the eccentric shaft inside the drum, an active isolation eccentric weight attached to each of the eccentric shaft inside the first active isolation mass and the second active isolation mass, and a vibration motor configured to rotate the eccentric shaft. When the eccentric shaft is (Continued)

rotated, a phase of a vibration generated by the active isolation eccentric weights is opposite to that of a vibration generated by the primary eccentric weight, and the vibration generated by the active isolation eccentric weights cancels the vibration generated by the primary eccentric weight.

9 Claims, 2 Drawing Sheets

(51) Int. Cl.
      *F16F 15/22*       (2006.01)
      *B06B 1/16*       (2006.01)

(52) U.S. Cl.
      CPC ....... *E01C 2301/00* (2013.01); *F16F 2232/02* (2013.01)

(58) Field of Classification Search
      USPC .......................................... 404/113, 117, 122
      See application file for complete search history.

(56) References Cited

U.S. PATENT DOCUMENTS

| | | | |
|---|---|---|---|
| 4,398,843 A * | 8/1983 | Bloom, Jr. | ............ E01C 19/286 |
| | | | 404/117 |
| 5,397,198 A * | 3/1995 | Bertrand | ............... E01C 19/286 |
| | | | 188/378 |
| 5,716,162 A | 2/1998 | Hodgson et al. | |
| 2004/0168531 A1 | 9/2004 | Mitsui | |
| 2012/0114416 A1 | 5/2012 | Marsolek et al. | |
| 2014/0133909 A1 | 5/2014 | Hansen et al. | |

\* cited by examiner

VIBRATION ISOLATION FOR COMPACTOR

TECHNICAL FIELD

The disclosure generally relates to construction vehicles, and more particularly, to active vibration isolation for a compactor with a vibratory roller used in the construction of roads.

BACKGROUND OF THE INVENTION

Vibratory compactors have parts that are caused to vibrate due to the rotation of a shaft that incorporates an eccentric weight. It is desirable to properly isolate the vibration from the rest of the structure for such compactors. For example, the vibration isolation method used for the drums of vibratory compactors for soil and asphalt is schematically shown in FIG. 1.

Vibration isolation is usually required between the drum and the rest of the machine, i.e., a frame as shown in FIG. 1.

Vibration isolation is typically achieved by using a resilient material, like rubber or metallic spring which is configured to connect the vibrating part to the rest of the machine. The use of rubber isolators between 'the drum and a carrier bearing' and 'the drum and a drive plate' is shown in FIG. 1.

A more sophisticated method of vibration isolation utilizes a secondary mass, which usually referred to as "dual stage isolation". If the mass and isolators are chosen correctly, this dual stage isolation system can result in better isolation than the "single stage isolation" system shown previously. The aim of the dual stage isolation system is to allow the dual stage isolation mass to have a lower amplitude vibration than the drum, thus transmitting less vibration to the frame.

The concept of this dual stage isolation system has been used in the past on an Ingersoll-Rand asphalt compactor. The dual stage isolation system is shown schematically in FIG. 2. There is a dual stage isolation mass between "the drum and the carrier bearing" and between "the drum and the drive plate", and each of components is buffered with an isolator.

SUMMARY OF THE INVENTION

The active isolation apparatus according to the present disclosure takes the dual stage isolation system and adds a mechanism that improves the isolation. The conventional dual stage isolation mass still has some vibratory amplitude, even though the vibration amplitude of the dual stage isolation mass is less than that of the drum. The active isolation apparatus according to the present disclosure adds an eccentric weight to the dual stage mass in such a way that it counteracts the motion of the dual stage mass caused by the drum vibration.

The active isolation apparatus according to the present disclosure comprises three eccentric weights; the primary one that is still inside the drum, and two additional weights in each of the active isolation masses. (The term "active isolation mass" is used to differentiate it from the passive isolation mass utilized in the usual dual stage isolation system in FIG. 2.) Also note that the active isolation eccentric weights 64 and 66 are out of phase with the primary eccentric weight 62 that is inside the drum 40. The active isolation eccentric weights 64 and 66 will move the active isolation masses 20 and 30 in the opposite direction to that the motion that the drum vibration is causing. All three eccentric weights 62, 64 and 66 are on a common shaft that is rotated by a single vibration motor 50. There might be a need of some joints in the shaft to allow for relative motion between parts 20, 30 and 60. The rotation of all jointed parts will be in common.

To describe this behavior in a different way, it is assumed that the drum is vibrating with an amplitude of 5 mm. For the dual stage system shown in FIG. 2, it is also assumed that the dual stage isolation mass is vibrating with an amplitude of 3 mm.

So the frame will experience the vibration caused by the 3 mm amplitude.

In the present disclosure, let us assume that the active isolation eccentric weight was chosen so that it causes the active isolation mass to be vibrated with an amplitude of 3 mm, and it is oriented so that the direction of this motion is directly opposite to the motion in the dual stage case. The effect of the drum vibration and the effect of the active isolation eccentric weight will cancel each other. The resultant vibration amplitude of the active isolation mass is zero. Thus, no vibration is imparted to the frame.

The above illustration is the ideal case. In practice, it is expected that there will still be some motion of the active isolation mass, but it is also expected that it will be very small compared to the vibration without the additional eccentric weight.

The active isolation apparatus according to the present disclosure is applicable to any situation where vibration is caused by a rotating shaft with an eccentric weight. For the sake of simplicity of explanation of the concept, the rest of this disclosure assumes the drum of a vibratory compactor as the part that is being isolated.

DETAILED DESCRIPTION OF THE INVENTION

The foregoing description of the embodiments of the present disclosure has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

As described in the "BACKGROUND OF THE INVENTION" section, a roller drum of a vibratory compactor includes a shaft that incorporates an eccentric weight which generates a vibration while being rotated. In the case where such a vibration is transmitted to a frame and other elements of the compactor, breakage or failure of parts may be caused. Thus, there is a need for a solution to reduce the vibration generated during rotation of the eccentric shaft of the roller drum so that the vibration cannot be transmitted to other parts of the compactor.

Figure 1:
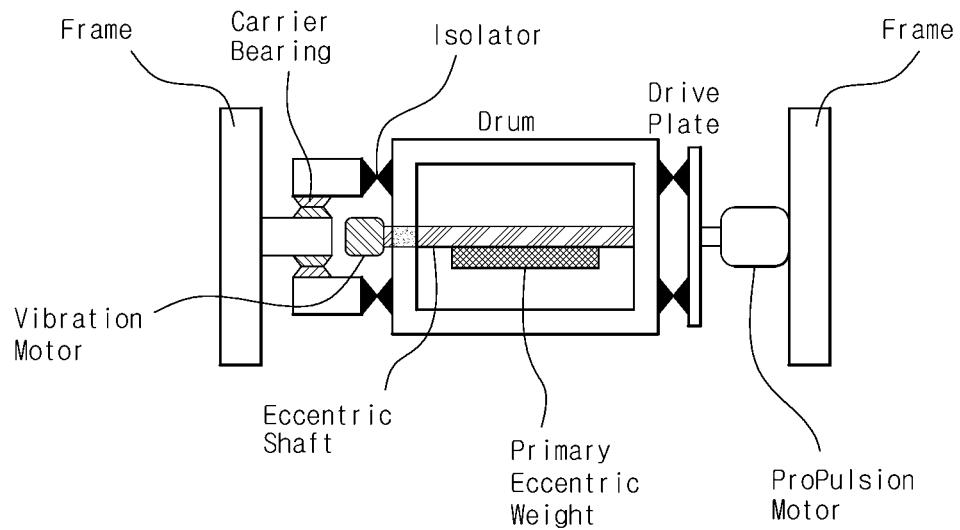
FIG. 1 is a cross-section view showing one example of a vibration isolation system for reducing a vibration generated from a vibratory compactor in accordance with the prior art.
Figure 2:
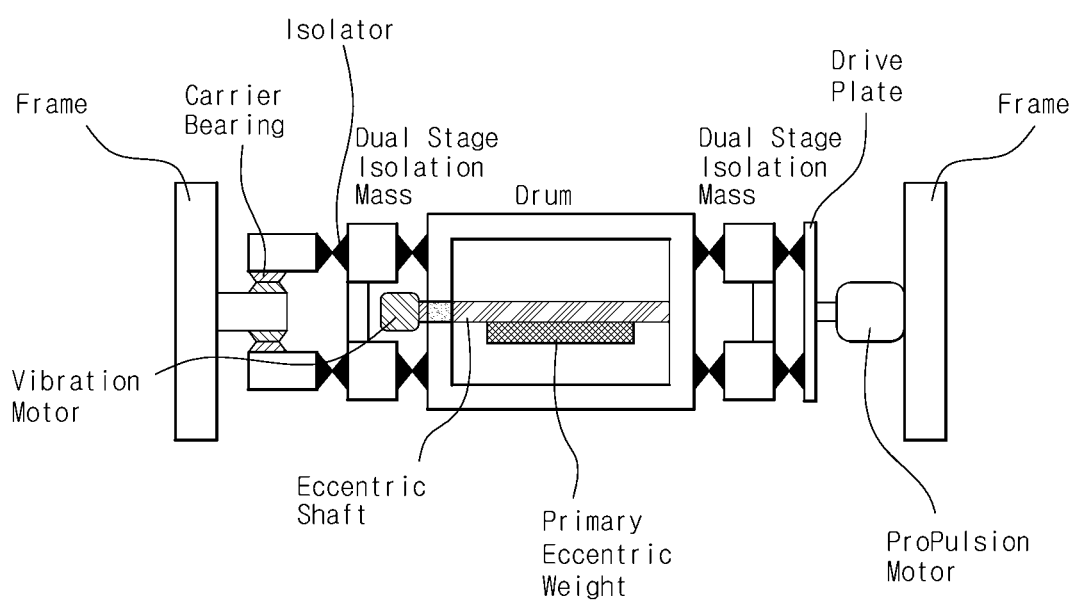
FIG. 2 is a cross-section view showing another example of a vibration isolation system for reducing a vibration generated from a vibratory compactor in accordance with the prior art.

The single stage isolation system in accordance with the prior art as shown in FIG. 1, adopts an isolator for isolating a drum from a frame to reduce a vibration, and the dual stage isolation system in accordance with the prior art as shown in FIG. 2 adopts a dual stage isolation mass between a drum and a carrier bearing and between the drum and a drive plate so as to isolate the drum from the frame. The active isolation apparatus in accordance with the present disclosure is an improvement of the conventional dual stage isolation of FIG. 2. The active isolation apparatus adopts new eccentric weights to generate a vibration having an opposite phase to that of the vibration generated by a primary eccentric weight that is positioned inside the drum so that vibration is more efficiently reduced.

Figure 3:
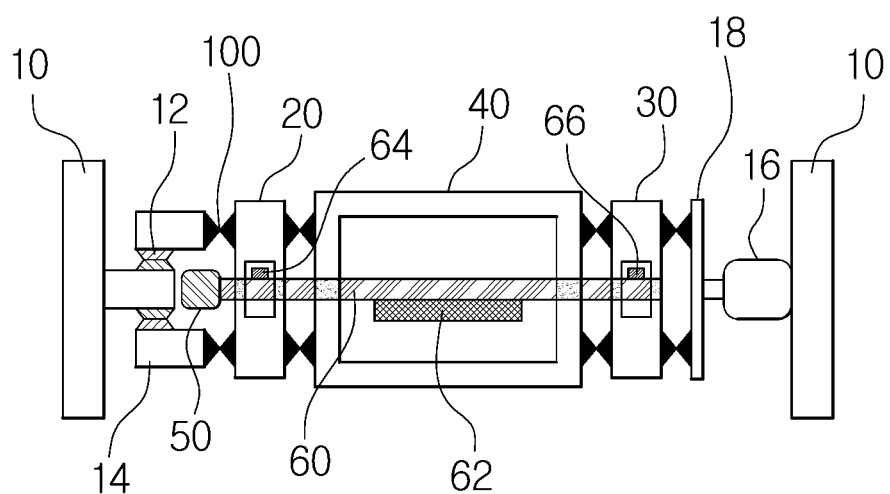
FIG. 3 is a cross-section view showing an active isolation apparatus for a vibratory compactor in accordance with an embodiment of the present disclosure.

FIG. 3 is a cross-section view showing an active isolation apparatus for a vibratory compactor in accordance with the present disclosure.

The active isolation apparatus in accordance with the present disclosure comprises a drum 40. The active isolation apparatus may further comprises a propulsion motor 16 for rotating the drum. The drum is typically a roller drum that is rotated. The roller drum for a vibratory compactor and eccentric weight 62 disposed therein to effectively compact a ground surface, and uses a vibration generated by the eccentric weight together with a force caused by the weight of the drum itself to generate a compressive force for compacting the ground surface.

In an embodiment, the propulsion motor can be supplied with power from an engine of the compactor, which is connected thereto through the frame. The propulsion motor may be connected to another power supply means. The propulsion motor generates a propulsive force for driving the drum.

The active isolation apparatus in accordance with the present disclosure comprises a drive plate that is positioned between the propulsion motor and the drum and is connected to the propulsion motor to transmit a rotating force to the drum.

The active isolation apparatus in accordance with the present disclosure comprises a drum support 14. Since the drum in the vibratory compact is disposed between the frames, a part needs to be mounted at one side of the frame so as to rotatably support the drum. The drum support 14 serves to rotatably support the drum. The drum support is connected to a carrier bearing 12 so that the drum can be rotated with respect to the frame.

The active isolation apparatus in accordance with the present disclosure comprises a first active isolation mass 20 and a second active isolation mass 30. The first active isolation mass 20 is disposed between the drum support 14 and the drum 40, and the second active isolation mass 30 is disposed between the drive plate 18 and the drum 40. Referring to FIG. 2, the isolation mass disposed between the drum and the frame and between the drum the drive plate is a part that merely has a constant weight and a simple structure. The isolation mass of the dual stage isolation system has a shortcoming in that it does not have a structure or a function that generates a vibration. On the contrary, each of the active isolation masses of the active isolation apparatus in accordance with the present disclosure has a space defined therein to allow each of the active isolation eccentric weights 64 and 66 to be rotated in the space. In addition, each of the active isolation masses has a through-hole formed therein to allow an eccentric shaft 60 to be penetratingly fitted thereto.

The active isolation apparatus in accordance with the present disclosure comprises the eccentric shaft 60 rotating in a state of penetrating passing through the first active isolation mass 20, the drum 40, and the second active isolation mass 30, and a vibrating motor 50 configured to rotate the eccentric shaft 60. In the prior art, the eccentric shaft is penetratingly fitted into only the drum, and serves merely to generate a vibration inside the drum during the rotation thereof. On the contrary, in the active isolation apparatus in accordance with the present disclosure, the eccentric shaft is designed to generate a vibration inside the active isolation masses as well as the drum during the rotation thereof.

Referring to FIG. 3, it has been shown that although the eccentric shaft 60 is penetratingly fitted into the first active isolation mass 20, the drum 40 and the second active isolation mass 30 in this order, it is merely one example and the eccentric shaft 60 may be penetratingly fitted into the first active isolation mass 20, the drum 40 and the second active isolation mass 30 in the order modified depending on the design of the vibratory compactor. In addition, referring to FIG. 3, the vibration motor 50 is disposed between the first active isolation mass 20 and the drum support 12 (i.e., disposed in proximity to a left frame), but may be disposed between the second active isolation mass 30 and the drive plate 18 (i.e., disposed in proximity to a right frame). The active isolation apparatus in accordance with the present disclosure comprises a plurality of connectors 100 disposed between the drum support and the first active isolation mass, between the first active isolation mass and the drum, between the drum and the second active isolation mass, and between the second active isolation mass and the drive plate.

The active isolation apparatus in accordance with the present disclosure comprises a primary eccentric weight 62 attached to the eccentric shaft 60 inside the drum, and one or more active isolation eccentric weights 64 and 66 attached to the eccentric shaft 60, respectively, inside the first active isolation mass 20 and the second active isolation mass 30. The primary eccentric weight 62 is rotated together with the rotation of the eccentric shaft 60 to generate a vibration inside the drum. The active isolation eccentric weight can be disposed inside the first active isolation mass 20 and the second active isolation mass 30, and is rotated together with the rotation of the eccentric shaft 60 to generate a vibration inside the active isolation masses. The active isolation eccentric weight 64 positioned inside the first active isolation mass 20 can be referred to as a first active isolation eccentric weight 64, and the active isolation eccentric weight 66 positioned inside the second active isolation mass 30 can be referred to as a second active isolation eccentric weight 66.

In the active isolation apparatus in accordance with the present disclosure, the active isolation eccentric weights and the primary eccentric weight are configured such that when the eccentric shaft is rotated, a phase of a vibration generated by the active isolation eccentric weights is opposite to that of a vibration generated by the primary eccentric weight. Referring to FIG. 3, the primary eccentric weight 62 and the two active isolation eccentric weights 64 and 66 are attached to the eccentric shaft 60 in different directions from each other. In order to reduce a vibration generated during the rotation of the primary eccentric weight, the active isolation eccentric weights are preferably attached to the eccentric shaft 60 in the opposite direction to a direction in which the primary eccentric weight is attached to the eccentric shaft 60. But this is an assumption of the ideal case, and the directions in which the primary eccentric weight and the active isolation eccentric weights are attached to the eccentric shaft 60 may be adjusted depending on the vibratory compactor.

In addition, the weights of the active isolation eccentric weights may be adjusted to reduce a vibration generated by the primary eccentric weight. The weight of the primary eccentric weight and the vibratory compactor may be adjusted depending on a speed range in which a rotary shaft is rotated. Further, the active isolation eccentric weight should be adjusted to have a size enough to be accommodated in each active isolation masses. The size of the internal space of the active isolation mass should be formed enough for the active isolation eccentric weight to be rotated based on the through-hole in which the eccentric shaft is rotated.

Resultantly, by virtue of the above configuration, when the eccentric shaft 60 is rotated, a vibration generated by the active isolation eccentric weights can cancel the vibration generated by the primary eccentric weight, and thus a vibration generated from the drum is prevented from being transmitted to the frame of the compactor.

The active isolation apparatus in accordance with another embodiment of the present disclosure may comprise at least one isolator disposed between the first active isolation mass 20 and the drum 40, between the first active isolation mass 20 and the drum support 14, between the second active isolation mass 30 and the drive plate 18, and between the second active isolation mass 30 and the drum 40. Further, at least one of the connectors 100 may serve as an isolator to reduce the vibration.

The isolator can reduce a vibration generated from the drum 40, the first active isolation mass 20, and the second active isolation mass 30 during the rotation of the drum. Preferably, the isolator can be made of a resilient material (e.g., rubber) that can absorb the vibration.

The active isolation apparatus in accordance with another embodiment of the present disclosure can be described in an aspect including the frame of the vibratory compactor.

In other words, the active isolation apparatus in accordance with another embodiment of the present disclosure may comprise a frame 10 that is provided at one side with a carrier bearing 12 and a drum support 14 to rotatably support the drum and is formed at the other side with a propulsion motor 16 connected to a drive plate 18. The carrier bearing and the drum support allow the drum to be rotated while being supported by a constant shaft between the frames.

The active isolation apparatus in accordance with another embodiment of the present disclosure comprises a first active isolation mass 20 disposed between the drum support and the drum, a second active isolation mass 30 disposed between the drive plate and the drum. In addition, the active isolation apparatus comprises an eccentric shaft 60 configured to be rotated while penetrating through the first active isolation mass 20, the drum, and the second active isolation mass 30, a primary eccentric weight 62 attached to the eccentric shaft 60 inside the drum, active isolation eccentric weights 64 and 66 attached respectively to the eccentric shaft 60 inside the first active isolation mass 20 and the second active isolation mass 30, and a vibration motor 50 configured to rotate the eccentric shaft 60.

In the active isolation apparatus in accordance with another embodiment of the present disclosure, when the eccentric shaft is rotated, a phase of a vibration generated by the active isolation eccentric weights is opposite to that of a vibration generated by the primary eccentric weight. The vibration generated by the active isolation eccentric weights cancels the vibration generated by the primary eccentric weight.

The primary advantage of the present disclosure is as follows. First, failure or breakage due to a vibration of other parts (e.g., drum frame, cooling packages, batteries, rollover protection apparatus (ROPS)) of the machine is prevented, and thus it can be expected that the costs spent for repair and replacement of parts due to failure will be reduced. The suppressed vibration of the machine provides an operator with increased comfort. In addition, since a vibratory load imposed on the machine will be much less, the suppression of a noise can be expected during the work.

The invention claimed is:

1. A vibratory compactor, comprising:
a drum;
a propulsion motor configured to rotate the drum;
a drive plate disposed between the propulsion motor and the drum in such a way as to be connected to the propulsion motor to transmit a rotating force to the drum;
a drum support configured to rotatably support the drum;
a first active isolation mass disposed between the drum support and the drum;
a second active isolation mass disposed between the drive plate and the drum;
a plurality of connectors disposed between the drum support and the first active isolation mass, between the first active isolation mass and the drum, between the drum and the second active isolation mass, and between the second active isolation mass and the drive plate;
an eccentric shaft configured to be rotated while penetrating through the first active isolation mass, the drum, and the second active isolation mass;
a primary eccentric weight attached to the eccentric shaft inside the drum;
an active isolation eccentric weight attached to the each of the eccentric shaft inside the first active isolation mass and the second active isolation mass; and
a vibration motor configured to rotate the eccentric shaft,
wherein when the eccentric shaft is rotated, a phase of a vibration generated by the active isolation eccentric weights is opposite to that of a vibration generated by the primary eccentric weight, and the vibration generated by the active isolation eccentric weights cancels the vibration generated by the primary eccentric weight.

2. The active isolation apparatus according to claim 1, wherein at least one of the connectors serves as an isolator, and the isolator reduces a vibration generated by the first active isolation mass, the drum, and the second active isolation mass when the drum is rotated.

3. The vibratory compactor according to claim 1, wherein at least one of the connectors serves as an isolator, and the isolator reduces a vibration generated by the first active isolation mass, the drum, and the second active isolation mass when the drum is rotated.

4. The vibratory compactor according to claim 3, wherein the isolator is made of a resilient material that can absorb the vibration.

5. The active isolation apparatus according to claim 3, wherein the isolator is made of a resilient material that can absorb the vibration.

6. A vibratory compactor comprising:
a drum;

a propulsion motor configured to rotate the drum;
a drive plate disposed between the propulsion motor and the drum in such a way as to be connected to the propulsion motor to transmit a rotating force to the drum;
a drum support configured to rotatably support the drum;
a frame provided at one side with a carrier bearing and the drum support and provided at the other side with the propulsion motor connected to the drive plate;
a first active isolation mass disposed between the drum support and the drum;
a second active isolation mass disposed between the drive plate and the drum;
a plurality of connectors disposed between the drum support and the first active isolation mass, between the first active isolation mass and the drum, between the drum and the second active isolation mass, and between the second active isolation mass and the drive plate;
an eccentric shaft configured to be rotated while penetrating through the first active isolation mass, the drum, and the second active isolation mass;
a primary eccentric weight attached to the eccentric shaft inside the drum;
active isolation eccentric weights attached respectively to the eccentric shaft inside the first active isolation mass and the second active isolation mass; and
a vibration motor configured to rotate the eccentric shaft,
wherein when the eccentric shaft is rotated, a phase of a vibration generated by the active isolation eccentric weights is opposite to that of a vibration generated by the primary eccentric weight, and the vibration generated by the active isolation eccentric weights cancels the vibration generated by the primary eccentric weight.

7. The vibratory compactor according to claim 6,
wherein at least one of the connectors serves as an isolator, and the isolator reduces a vibration generated by the first active isolation mass, the drum, and the second active isolation mass when the drum is rotated.

8. The vibratory compactor according to claim 7, wherein the isolator is made of a resilient material that can absorb the vibration.

9. The active isolation apparatus comprising:
a drum;
a drive plate to rotate the drum;
a drum support configured to rotatably support the drum;
a first active isolation mass disposed between the drum support and the drum;
a second active isolation mass disposed between the drive plate and the drum;
a plurality of connectors disposed between the drum support and the first active isolation mass, between the first active isolation mass and the drum, between the drum and the second active isolation mass, and between the second active isolation mass and the drive plate;
an eccentric shaft configured to be rotated while penetrating through the first active isolation mass, the drum, and the second active isolation mass;
a primary eccentric weight attached to the eccentric shaft inside the drum;
an active isolation eccentric weight attached to each of the eccentric shaft inside the first active isolation mass and the second active isolation mass; and
a vibration motor configured to rotate the eccentric shaft,
wherein when the eccentric shaft is rotated, a phase of a vibration generated by the active isolation eccentric weights is opposite to that of a vibration generated by the primary eccentric weight, and the vibration generated by the active isolation eccentric weights cancels the vibration generated by the primary eccentric weight.

\* \* \* \* \*